June 13, 1950 J. J. FAGAN 2,511,771

MEMORANDUM PAPER HOLDER

Filed Dec. 5, 1945

Inventor

James J. Fagan

By

Charles W. Dake

Attorney

Patented June 13, 1950 2,511,771

UNITED STATES PATENT OFFICE 2,511,771

MEMORANDUM PAPER HOLDER

James J. Fagan, Muskegon, Mich.

Application December 5, 1945, Serial No. 632,887

2 Claims. (Cl. 281—6)

The present invention relates to improvements in memorandum paper holding devices and particularly to memorandum paper holding devices for telephone stands, whereby a roll of memorandum paper is rotatably supported with its free end extending under the telephone and bent back onto an inclined portion for supporting the paper while being written thereon; and the objects of improvement are: first, to provide a memorandum paper holding device for rotatably holding a roll of paper with flat means for supporting the paper while the paper is being written on; second, to provide a simple memorandum paper holding device; third, to provide a memorandum paper holding device that is adaptable to hold a roll in combination with an inclined flat desk portion on which to rest the memorandum paper while being written on; fourth, to provide a memorandum paper holding device that will hold a roll of memorandum paper and having means whereby the paper after being written on can be torn transversely; fifth, to provide a memorandum paper holder that will be convenient while the telephone is being used; sixth, to provide a memorandum paper holder that will extend under and be attached to the telephone stand.

Figure 1:
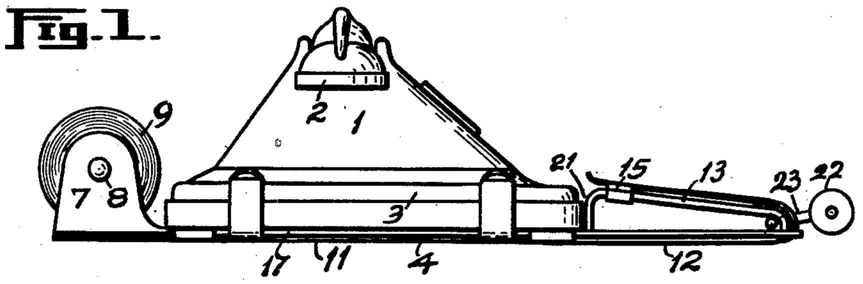

These above named objects and such other objects as appear from a perusal of the following description and accompanying drawings are attained by the structure illustrated in said drawing, in which:

Figure 1 is a side elevation of a telephone stand mounted on the memorandum paper holder and the holder with a roll of memorandum paper mounted on the holder in readiness to be written thereon.

Figure 2:
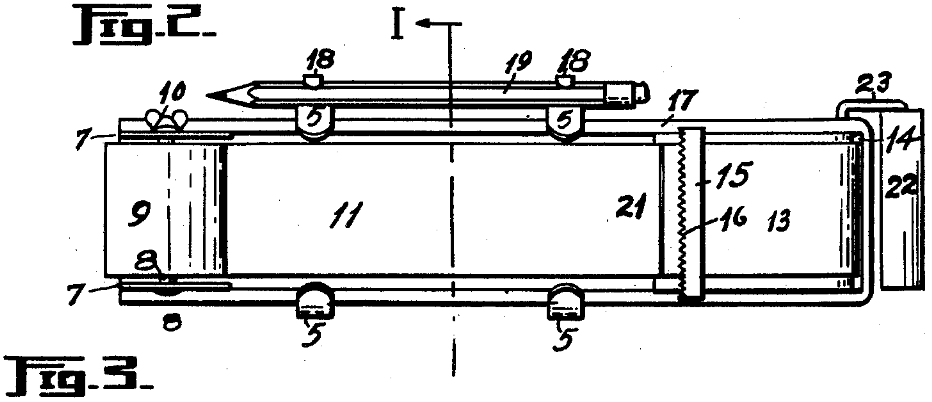

Figure 2, a plan view of the memorandum paper holder with a roll of memorandum paper rotatably mounted at one end of its ends and the flat inclined desklike portion at the opposite end.

Figure 3:
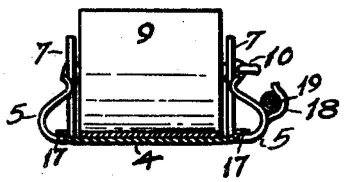

Figure 3, a cross-sectional view of the memorandum paper holder taken on a transverse plane on line I in Figure 2 and viewed in the direction indicated.

Figure 4:
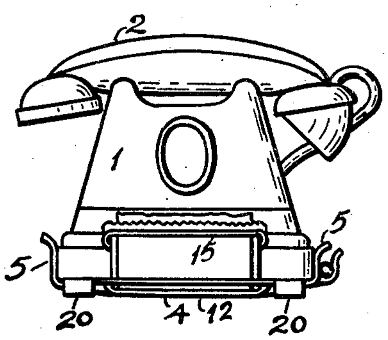

Figure 4, an end elevation of the memorandum paper holder as viewed from the inclined flat desklike portion on which the paper is extended for writing on the paper.

Throughout the several views of the accompanying drawing illustrating the invention, similar numerals refer to similar parts and portions of the invention, and referring thereto:

Numeral 1 refers to a telephone stand having a telephone receiver 2 resting thereon and having a base portion 3. Numeral 4 refers to the base of the paper holder above which is mounted the telephone stand and fastened thereto by flat spring clips 5 extending from the outwardly extending edge of the base 4 upwardly at each side of the telephone base 3 in spaced apart relation to each other at each said sides. Numeral 7 refers to the memorandum paper roll supporting brackets having extending therethrough and from side to side of the brackets a removable rod 8 rotatably supporting the roll 9 of memorandum paper which is tensioned to prevent free unwinding by thumb nut 10. Numeral 11 refers to the portion of the memorandum paper that has been unrolled and extends under the telephone from end to end thereof and over the base portion 12 of the inclined desklike portion 13 which has at its end farthest from the telephone, a slot 14 extending transversely thereof through which the paper is drawn onto the desklike portion which has a paper tearing and tension member 15 of thin sheet metal, having at its edge toward the telephone, teeth 16 whereby tearing of the paper is facilitated subsequent to writing thereon.

The portion 4 extending under and longitudinally thereof at each of its sides, has a raised flange 17 on which the telephone stand rests and whereby clearance is provided for the passage of the memorandum paper under the telephone from the roll 9 to the slot 14 through which the paper is threaded and the end of the paper then placed under the paper tearing and tension member 15 which is bent around the edge of the inclined desklike portion 13 and slidable longitudinally thereof so that the paper may be extended beyond the teeth 16 sufficient to be grasped and drawn to the end of the memorandum written thereon while the portion on the inclined desklike portion is on the inclined portion 13 and when so drawn the paper may be torn from the portion of the memorandum paper extending onto the inclined portion 13.

The clips 5 at one side of the memorandum paper holder have preferably formed thereon, clips 18 for holding a pencil or other writing instrument 19. Under each corner of base 3 of the telephone stand 1 are pads 20 whereby the telephone stand, together with the memorandum paper holder, is raised from any surface the telephone is placed on.

Between the base 3 of the telephone and the inclined portion of the desklike member 13 is a clearance 21 through which the memorandum paper may be threaded and folded over the upper edge of the incline and brought to the lower end and there wound on roller 22 which is pivotally mounted on a wire bracket 23 having one of its ends extending into the opening caused by the bend at the slot 14 and swingable therein. The inclined desklike portion may be made of wood having a hole into which the end of the wire bracket 23 may extend, and the roller 22 used to wind the memorandum paper on for rolling the records of the memorandum instead of tearing off by the member 15 and thereby providing a rolled record of a plurality of memorandum records.

Having described and illustrated my present invention, the rights thereto I desire to obtain by Letters Patent are:

1. A memorandum paper holder comprising a sheet metal base member with upturned ears at the rear end thereof adapted to support a paper roll, a central depressed portion the length thereof, the forward end thereof return bent upwardly and rearwardly to form a desklike portion and thence bent downwardly with a space between the downwardly bent portion and the roll holder.

2. A memorandum paper holder comprising a sheet metal base member with upturned ears at the rear end thereof adapted to support a paper roll, a central depressed portion the length thereof, the forward end thereof return bent upwardly and rearwardly to form a desklike portion and thence bent downwardly with a space between the downwardly bent portion and the roll holder, a used paper roll supported adjacent the return bend.

JAMES J. FAGAN.

REFERENCES CITED

The following references are of record in the file of this patent:

UNITED STATES PATENTS

| Number | Name | Date |
|---|---|---|
| 1,390,705 | Hattersley | Sept. 13, 1921 |
| 1,875,543 | Albritton | Sept. 6, 1932 |